M. J. DUFFY.
MILK BOTTLE.
APPLICATION FILED NOV. 27, 1912.
1,146,313.
Patented July 13, 1915.
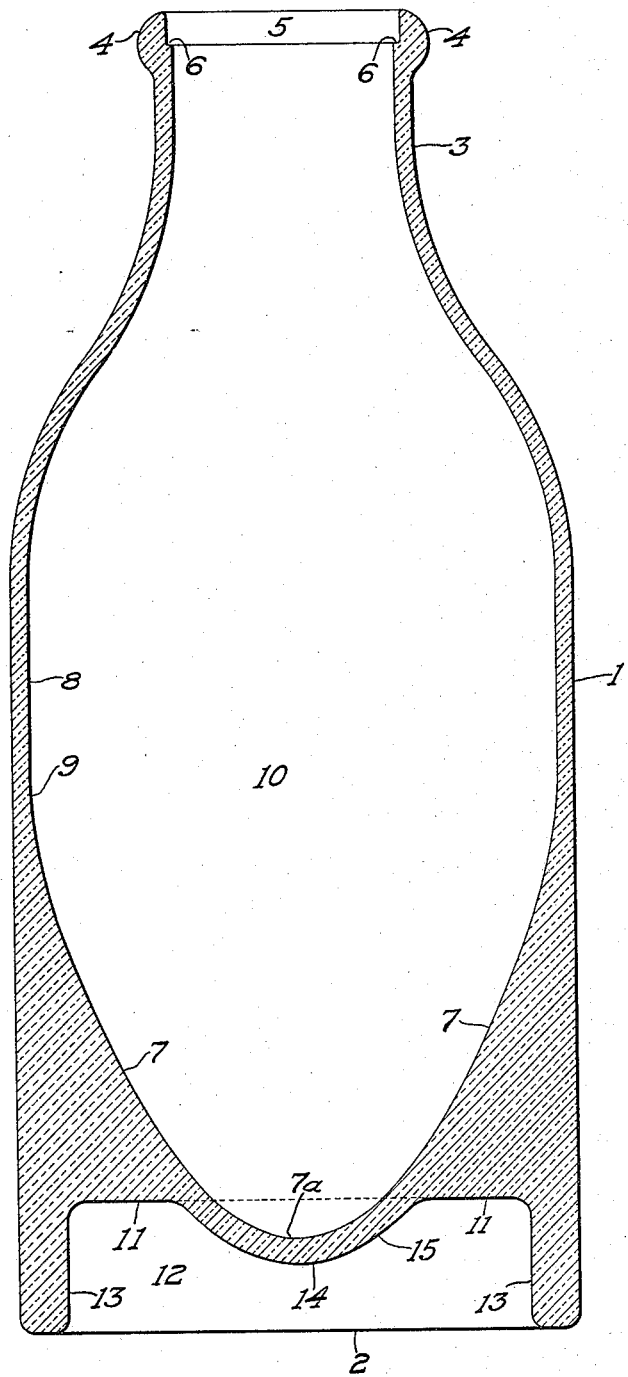

UNITED STATES PATENT OFFICE.

MICHAEL J. DUFFY, OF NEW YORK, N. Y.

MILK-BOTTLE.

1,146,313.  Specification of Letters Patent.  Patented July 13, 1915.

Application filed November 27, 1912. Serial No. 733,776.

*To all whom it may concern:*

Be it known that I, MICHAEL J. DUFFY, a citizen of the United States, and resident of the city of New York, in the county of Kings and State of New York, have invented certain new and useful Improvements in Milk-Bottles, of which the following is a specification.

This invention relates to milk-bottles and particularly to those used in milk delivery systems.

The bottles of milk, as is well known, are usually delivered to homes at the early morning hours, and are frequently left upon stone surfaces, which happen to be convenient, such as window sills, side-walks, door sills, etc., so that the bottles remain outdoors in such situation for a considerable length of time, until removed indoors by the occupants.

In summertime, the contact of the stone surface with the underside of the bottle causes the temperature of the milk to be raised considerably, which is objectionable.
Similarly, in wintertime, the extreme cold of the stone is transmitted to the comparatively warm milk, thereby lowering its temperature considerably, and even freezing it, which impairs the milk, at times causes the bottle to break, and is otherwise objectionable. Another disadvantage that presents itself, in winter, to the milk bottles used at present, is that when placed in said situation the bottle becomes covered with a layer of moisture, or water globules, caused by the saturation of the air when coming in contact with the comparatively warm surface of the bottle, which warmth is derived from the milk. This development of moisture is particularly heavy at the underside of the bottle, and on the walls of the bottle for some distance from its base, due to the cold stone surface, and hence said underside often freezes to the stone, which causes the milk to become impaired or freeze, and often the bottle is caused to break. Said moisture on the walls of the bottle adjacent its base often accumulates and drips down to the bottom of the bottle where it forms an additional danger of its freezing to the stone.

The principal object of my invention is to provide a simple, inexpensive, and improved milk-bottle.
Another object is to provide a milk-bottle having means for remedying the aforesaid disadvantages.

A further object is to provide a milk-bottle adaptable for improved sanitary cleaning.

In carrying out the invention, the interior bottom of the bottle is made in parabolic form, which is suitably proportioned, and the underside of the bottle has a cavity formed thereby and by a surrounding circumscribing wall serving as a base for the bottle.

I find that giving the interior bottom of the bottle an approximately parabolic configuration prevents the accumulation thereupon of solid substances from the milk, which adhere firmly to the bottom surfaces of all other milk-bottles used at present, and hence this form is conducive to thorough cleaning and renders the bottle more sanitary. Said air cavity insulates the milk against the excessive warmth of the stone in summer, and against its extreme cold in winter, whereby the temperature of the milk is maintained longer and uniform throughout, and its impairment or freezing prevented. The underside of the bottle being maintained elevated and away from the surface of the stone, by said wall circumscribing the cavity, prevents its freezing to the stone. Besides being conducive to increased sanitation, said parabolic form also gives to the lower portion of the bottle-wall in conjunction with its vertical exterior a triangular form, which properly insulates the exterior surface of said portion against being warmed by the milk, so that little or no saturation takes place thereupon, and consequent dripping of moisture to the base of the bottle is prevented and its freezing to the stone thus further precluded.

Other objects and advantages will hereinafter appear.

The accompanying drawing shows a sectional elevation, taken through the longitudinal center line of the bottle.

The exterior of the bottle is preferably formed similarly to a conventional milk-bottle, and consists of a cylindrical wall 1 extending from the base 2 to about two-thirds of the height of the bottle, and from there curves gradually into the configuration of a neck 3, suitably proportioned to be grasped conveniently by the user. At the top of the neck is formed a rim 4, serving as a reinforcement, which has a recessed portion 5 providing a seat 6 upon which a circular cardboard or other suitable cover, not shown, seals the contents. At the upper portion of the bottle the glass wall is of suitable uniform thickness, so that the interior thereat follows the general configuration of the exterior.

The interior bottom 7 of the bottle has the form of a parabola, or a general parabolic configuration, the vertex 7ª of which constitutes the lowest portion of the interior. In the preferred form the axis of the parabola coincides with the longitudinal center line of the bottle, the base of the parabola is equal to the inside diameter of the bottle at 8 and merges with the interior wall at 9, and the height of the parabola, or distance from 10 to 7ª is about the same as the parabola-base, or said inside diameter. At the underside 11 of the bottle is provided a cavity 12 formed thereby and by a circumscribing annular wall 13, which is sufficiently thick to serve as a base 2 for the bottle. In practice, the depth of said cavity from underside 11 to base 2 is about one inch, and from the lowest point 14 of the parabolic portion 15, which protrudes within cavity 12, to the base 2 is about half an inch. This parabolic configuration of the bottom 7 of the bottle prevents objectionable accumulation of dry substances from the milk upon its surface, and enables thorough sanitary cleansing thereof. It furthermore gives to the lower portion of the bottle, with relation to the vertical exterior wall 1, a properly adapted triangular form, which commences at about 9 and increases in thickness gradually downward. This prevents the exterior surface of said lower portion being warmed by the milk, whereby dripping of moisture at said lower portion, caused by saturation of the cold air thereagainst in wintertime, is avoided and freezing of the bottle to the surface it is placed upon is precluded. The cavity 12 at the underside of the bottle insulates the milk against the extreme cold of the surface upon which the bottle is placed, thereby maintaining the temperature of the milk longer, more uniform, and preventing its freezing; and the circumscribing wall 13 in thus raising the underside 11 of the bottle prevents its freezing to the surface placed upon.

Variations may be resorted to within the scope of the invention.

Having thus described my invention, I claim:—

1. In a glass milk-bottle adaptable for delivery systems, the lower portion of the bottle having its side wall triangular in cross section and adaptable to protect the milk thereat against extreme degrees of temperature of the surface upon which the bottle rests, the interior bottom of the bottle joining the interior of the side wall in the configuration of a suitably adapted parabola, said lower portion of the wall bounded by a vertical exterior, a horizontal underside, and an oblique substantially straight interior, and the underside of the bottle having a surrounding wall to elevate said lower portion.

2. A glass milk-bottle adaptable for delivery systems having its side wall at its lower portion triangular in cross section to protect the milk thereat against the temperature of the surface upon which the bottle rests, said lower portion of the wall bounded by a vertical exterior, a horizontal underside, and an oblique substantially straight interior, and the horizontal underside of said lower portion of the wall being elevated above the surface upon which the bottle rests.

3. In a glass milk-bottle adaptable for delivery systems, the lower interior bottom portion of the bottle having an approximately parabolic form, said portion having its side wall triangular in cross section and adapted to protect the milk thereat against temperature extremes, said lower portion of the wall bounded by a vertical exterior, a horizontal underside, and an oblique substantially straight interior, and the underside of the bottle having a surrounding wall adapted to elevate the exterior bottom of the bottle and forming an air cavity below said bottom adapted to elevate and insulate the contents within said parabolic portion against the temperature of the surface upon which the bottle rests.

Signed at the city of New York, in the county of Kings, and State of New York, this 25th day of November, A. D. 1912.

MICHAEL J. DUFFY.

Witnesses:
B. ROMAN,
M. LEVY.

Copies of this patent may be obtained for five cents each, by addressing the "Commissioner of Patents, Washington, D. C."